(12) United States Patent
Barton et al.

(10) Patent No.: US 8,405,251 B2
(45) Date of Patent: Mar. 26, 2013

(54) METHOD AND APPARATUS FOR REDUCTION OF HARMONICS IN A POWER SUPPLY

(75) Inventors: Werner Barton, Gescher (DE); Andre Langel, Münster (DE)

(73) Assignee: General Electric Company, Schenectady, NY (US)

( * ) Notice: Subject to any disclaimer, the term of this patent is extended or adjusted under 35 U.S.C. 154(b) by 95 days.

(21) Appl. No.: 12/763,249

(22) Filed: Apr. 20, 2010

(65) Prior Publication Data

US 2011/0133563 A1 Jun. 9, 2011

(51) Int. Cl.
*H02J 3/00* (2006.01)
*F03D 9/00* (2006.01)
*H02P 9/00* (2006.01)

(52) U.S. Cl. .......................................... 307/84; 290/44
(58) Field of Classification Search .................... 307/84; 290/44

See application file for complete search history.

(56) References Cited

U.S. PATENT DOCUMENTS

| | | | |
|---|---|---|---|
| 6,670,721 B2 * | 12/2003 | Lof et al. | 290/44 |
| 7,042,110 B2 * | 5/2006 | Mikhail et al. | 290/44 |
| 7,071,579 B2 * | 7/2006 | Erdman et al. | 290/55 |
| 7,392,114 B2 * | 6/2008 | Wobben | 700/286 |
| 7,505,833 B2 * | 3/2009 | Delmerico et al. | 700/291 |
| 8,198,753 B2 * | 6/2012 | Algrain | 307/84 |
| 2010/0156192 A1 * | 6/2010 | Wang et al. | 307/82 |
| 2010/0264666 A1 * | 10/2010 | Bo et al. | 290/55 |

* cited by examiner

*Primary Examiner* — Hal Kaplan
(74) *Attorney, Agent, or Firm* — Global Patent Operation; Douglas D. Zhang

(57) ABSTRACT

A power supply device adapted for supplying electrical power to a load comprises a first electrical generator adapted for providing a first output current having a first phase angle; at least a second electrical generator adapted for providing a second output current having a second phase angle independent of the first phase angle; and a combination unit adapted for combining the first output current and the second output current to a combination current having reduced harmonics compared to the first and second output currents.

19 Claims, 6 Drawing Sheets

METHOD AND APPARATUS FOR REDUCTION OF HARMONICS IN A POWER SUPPLY

BACKGROUND OF THE INVENTION

The present disclosure generally relates to power supply devices for supplying an electrical power to a load such as an electrical power supply grid. In particular, the present disclosure relates to an apparatus adapted for combining electrical outputs of electrical generators of different wind turbines. Furthermore, the present disclosure relates to a method for combining electrical outputs of electrical generators of different wind turbines.

Wind turbines are of increasing importance as environmentally safe and reliable energy sources. Typically, wind turbines are arranged within wind turbine farms, briefly referred to as "wind farms". These wind farms are typically located in geographical regions where appropriate environmental conditions for running a large number of wind turbines prevail.

In an individual wind turbine, the kinetic energy of an air stream is converted into electrical energy. To this end, an air stream energy or wind energy is converted into rotational energy which can be used to drive an electrical generator. Typically, each wind turbine includes these electrical generators which provide an electrical output on the basis of the rotational energy input. In wind farms, the outputs of individual electrical generators are combined to provide an electrical energy output e.g. to an electrical power supply grid.

For generation and/or conversion of an electrical output energy of an electrical generator of a wind turbine in a predetermined frequency and/or voltage range, harmonics with respect to a fundamental frequency or a grid frequency (e.g. 60 Hz in the US and 50 Hz in Europe) may occur. These harmonics may be superposed onto the electrical output currents of the individual electrical generators and may cause problems e.g. with respect to electrical and electronic components arranged within a wind farm. Typically, there is an admissible level of harmonics which is allowed within a wind farm and/or at an energy output unit connecting the wind farm to an electrical power supply grid.

BRIEF DESCRIPTION OF THE INVENTION

In view of the above, a power supply device adapted for supplying electrical power to a load is provided, the power supply device including a first electrical generator adapted for providing a first output current having a first phase angle, at least a second electrical generator adapted for providing a second output current having a second phase angle independent of the first phase angle, and a combination unit adapted for combining the first output current and the second output current to a combination current having reduced harmonics with respect to the first and second output currents.

According to another aspect a wind farm adapted for supplying electrical power to a load is provided, the wind farm including a first wind turbine having a first electrical generator, wherein the first electrical generator is adapted for providing a first output current having a first phase angle, a second wind turbine having a second electrical generator wherein the second electrical generator is adapted for providing a second output current having a second phase angle independent of the first phase angle; and a combination unit adapted for combining the first output current and the second output current to a combination current having reduced harmonics with respect to the first and second output currents.

According to yet another aspect a method for operating at least two electrical generators is provided, the method including the steps of providing a first output current having a first phase angle, the first output current being generated by a first electrical generator, providing a second output current having a second phase angle independent of the first phase angle, the second output current being generated by a second electrical generator, combining the first output current and the second output current to a combination current having reduced harmonics with respect to the first and second output currents, and outputting the combination current to a specified load.

Further exemplary embodiments are according to the dependent claims, the description and the accompanying drawings.

BRIEF DESCRIPTION OF THE DRAWINGS

A full and enabling disclosure, including the best mode thereof, to one of ordinary skill in the art is set forth more particularly in the remainder of the specification including reference to the accompanying drawings wherein.

DETAILED DESCRIPTION OF THE INVENTION

Figure 1:
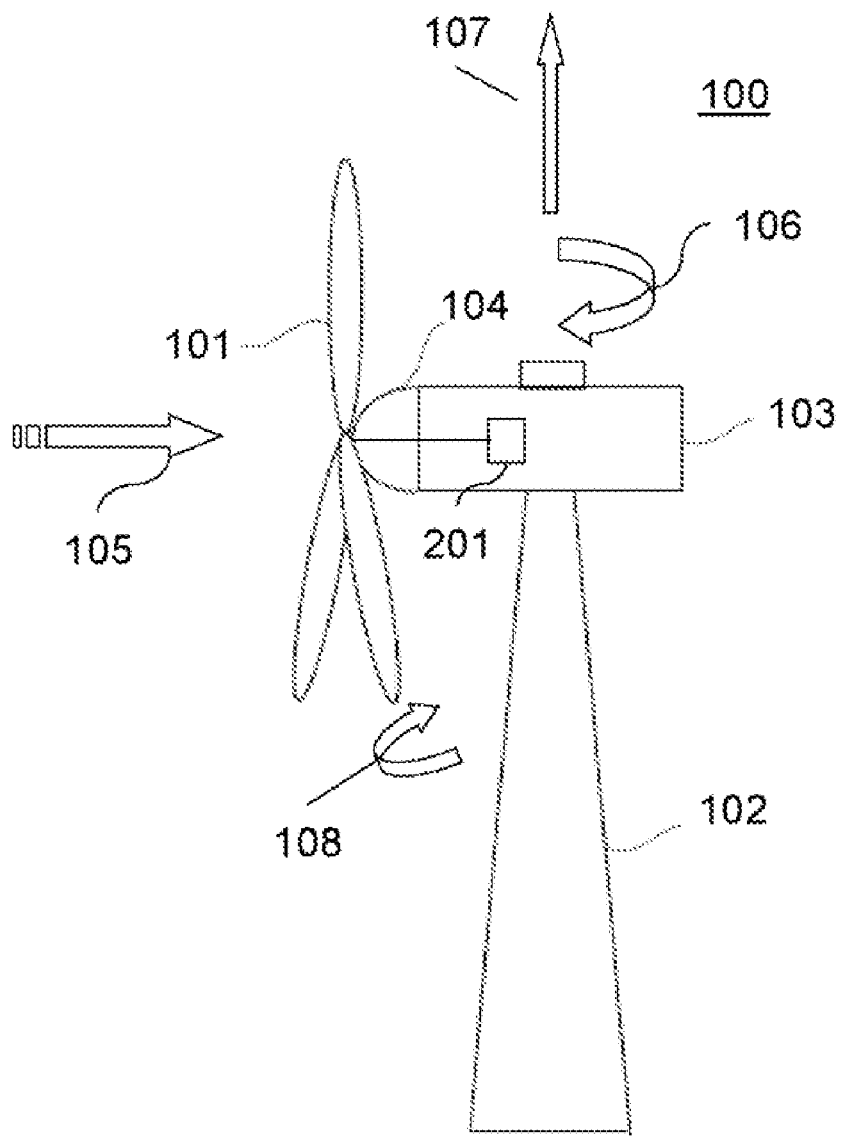
FIG. 1 shows a side view of a wind turbine for converting wind energy into electrical energy.

Reference will now be made in detail to the various exemplary embodiments, one or more examples of which are illustrated in the drawings. Each example is provided by way of explanation and is not meant as a limitation. For example, features illustrated or described as part of one embodiment can be used on or in conjunction with other embodiments to yield yet a further embodiment. It is intended that the present disclosure includes such modifications and variations.

A number of embodiments will be explained below. In this case, identical structural features are identified by identical reference symbols in the drawings. The structures shown in the drawings are not depicted true to scale but rather serve only for the better understanding of the embodiments.

FIG. 1 is a side view of a wind turbine 100 which is used for converting energy of incoming wind 105 into a rotational energy which is transferred to an electrical generator 201 via a rotation of rotor blades 101. The wind turbine 100 includes at least one rotor blade 101 attached to a hub 104 which is rotatably attached at a machine nacelle 103. The machine nacelle 103 is mounted atop a tower 102 and can be rotated about a vertical axis by applying a yaw momentum 107. A yaw angle 106 is adjusted such that a typically vertical axis of the hub 104 of the rotor of the wind turbine 100 typically coincides with the direction of the incoming wind 105. By changing the yaw angle 106 in such a way, an energy conversion efficiency from rotational energy into electrical energy can be adjusted. The electrical generator 201 of the wind turbine 100 provides electrical output energy, e.g. for an electrical power supply grid (not shown in FIG. 1).

As wind turbines 100 are located in areas where appropriate winds prevail, typically a plurality of wind turbines 100 are arranged within that local area, e.g. within a "wind farm". The individual wind turbines 100 of a wind farm may be controlled by a central wind farm management system. As each wind turbine 100 includes an individual electrical generator 201, each wind turbine 100 provides an individual electrical energy output into an electrical power supply grid.

Figure 2:
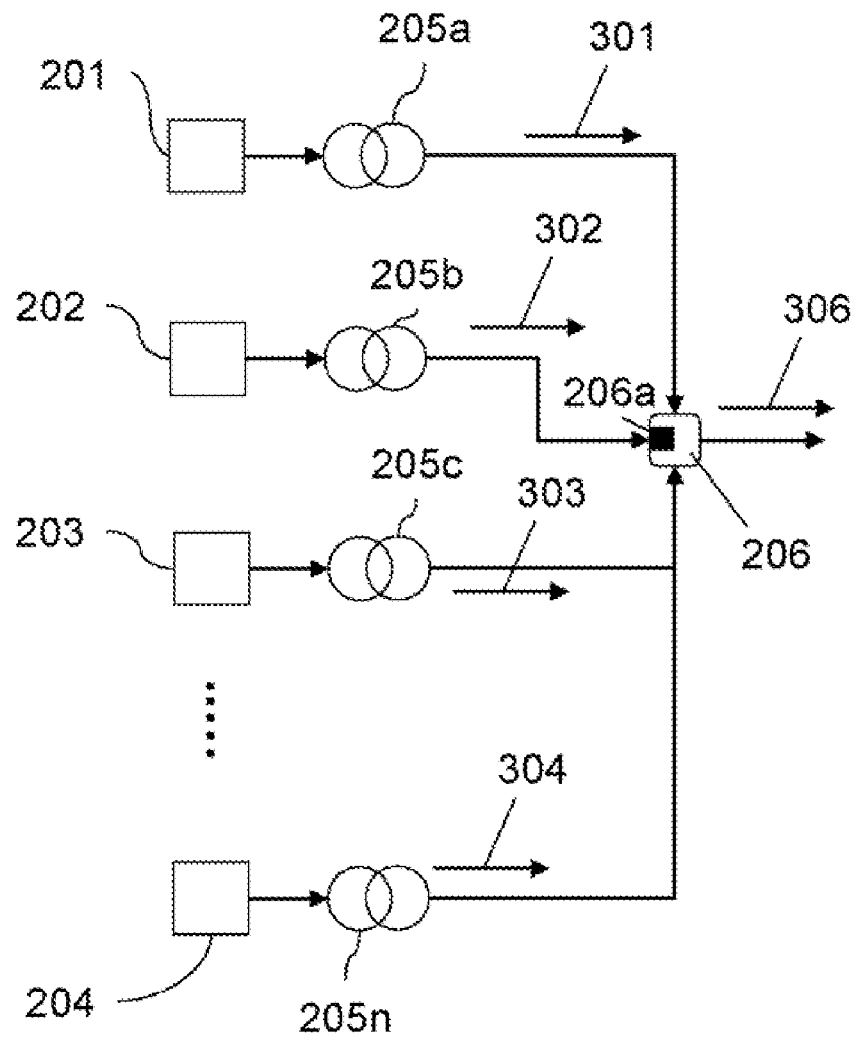
FIG. 2 illustrates a block diagram of a power supply device including a number of electrical generators and a combination unit, according to a typical embodiment.

FIG. 2 illustrates a power supply device 200 including a plurality of electrical generators 201, 202, 203 . . . 204. These electrical generators 201-204 may be arranged in individual wind turbines 100, although the wind turbines are not shown in FIG. 2. The first electrical generator 201 provides an electrical output energy in a low-voltage range and is connected to a transformer 205a which transforms the electrical output energy from a low-voltage range into a high-voltage range. In a similar manner, a second electrical generator 202 is connected to another transformer 205b for a similar conversion of its electrical output energy into the high-voltage range. A third electrical generator 203 is connected to a third transformer 205c. It is noted here that the transformers may be devices of different vector group configurations or vector groups, e.g. dyn 5 and/or dyn 11.

It is noted here that a number of n (the electrical generator indicated by a reference numeral 204 is the n-th electrical generator) electrical generators can be provided. In the high-voltage range, a first output current 301 is derived from the transformer 205a of the first electrical generator 201, a second output current 302 is derived from the transformer 205b of the second electrical generator 202, a third output current 303 is derived from the transformer 205c of the third electrical generator 203, and so on, until the n-th output current 304 is derived from the transformer 205n of the n-th electrical generator 204. The output currents 301, 302, 303 and 304 are transferred via electrical cables to a combination unit 206 which typically adds the individual output currents in order to obtain a combination current 306 provided at the output of the combination unit 206. It is noted here that the combination unit 206 may be provided as an electrical connection such as an electrical terminal. The combination unit 206 is not necessarily a separate electronic component.

The combination unit 206 is provided for combining output currents of individual generators to generate the combination current 306. In order to perform such kind of combination the combination unit 206 may include a bus bar to which the individual generator outputs are connected. The combination unit then acts as a means for summing up the currents at its input units.

In an alternative embodiment the combination unit 206 may include electronic components adapted for controlling the combination current 306 on the basis of the output currents 301-304 output from the transformers 205a-205n. Such electronic components may form a current adding unit adapted for adding up currents at its input units.

Moreover, a filter means 206a adapted for filtering the combination current is provided in the combination unit 206. The filter means 206a may be provided as a low-pass filter adapted to filter out higher harmonics of a grid frequency from the combination current 306. Furthermore the filter means 206a may be provided as a notch filter which is capable of eliminating predetermined frequencies included in the combination current 306 output from the combination unit 206. For specific applications the filter means 206a may be designed as a band pass filter unit. It is noted here that filter means such as the filter means 206a of the combination unit 206 may be provided at different locations within the wind farm. For example, the filter means may be provided individually for each wind turbine, or a filter means may be collectively provided for a number of wind turbines.

It is noted here that phase angles of the output currents are adjusted such that, upon combining them, a level of harmonics of a fundamental wave in the combination current is reduced. This level of harmonics e.g. may be defined as an amplitude of at least one specific harmonic, related to the fundamental wave.

According to a typical embodiment the electrical generators 201-204 and/or the transformers 205a-205n connected to the respective electrical generators 201-204 may be different to each other with respect to their electrical design as for example with respect to different windings of the electrical generators and/or transformers.

A combination of the individual output currents 301-304 which are generated on the basis of different electrical energy generation systems (electrical generators 201-204 and transformers 205a-205n) exhibit a different harmonic pattern. Harmonics may be generated during the energy conversion process in the individual electrical generators 201-204 and/or during voltage transformation (e.g. from the low-voltage range into the high-voltage range by means of the transformers 205a-205n).

Due to the superposition of the outputs of the individual energy transformation systems it is possible to cancel out harmonics, at least partially. Furthermore, the harmonics will appear continuously at different phases with respect to each other such that a summation of harmonics may result, at least partially, in their cancellation.

Figure 3:
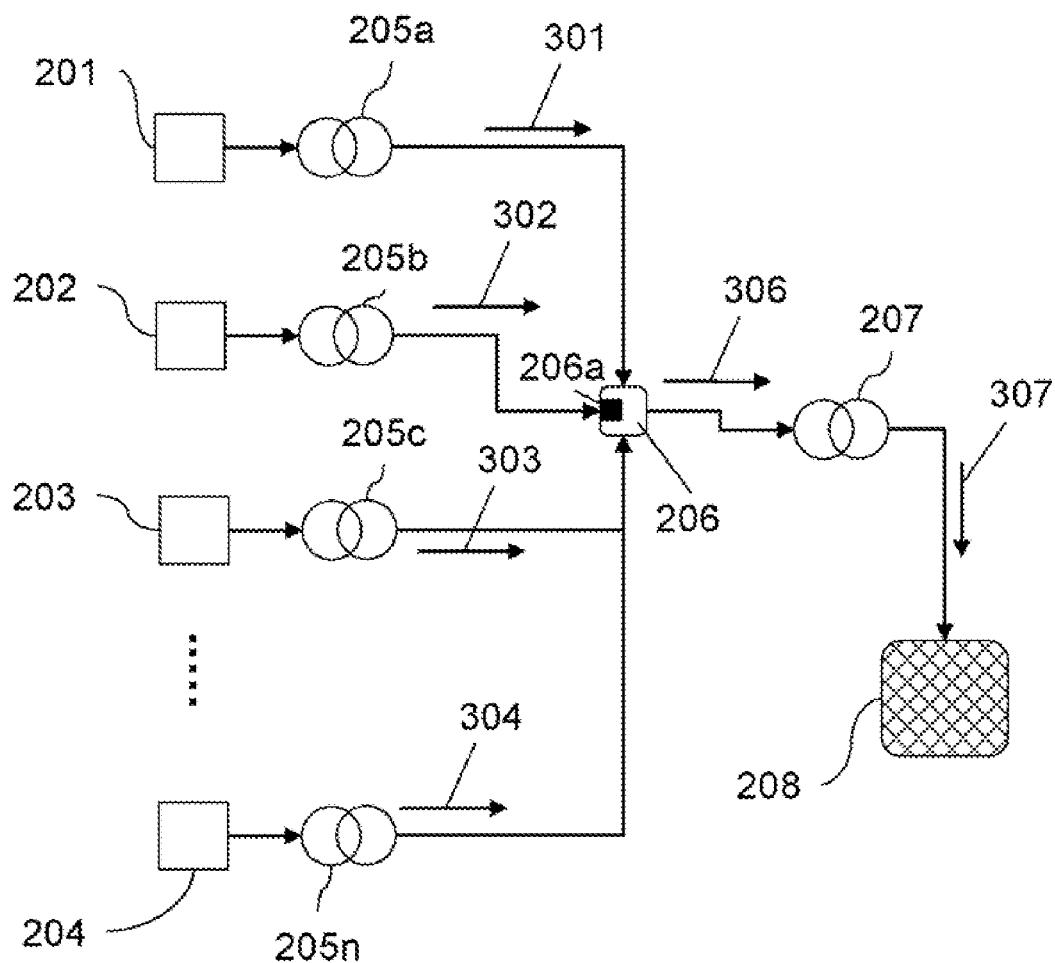
FIG. 3 exhibits another block diagram illustrating a power supply device including a plurality of electrical generators and an electrical power supply grid connected to a combination unit via an output transformer, according to another typical embodiment.

FIG. 3 is a block diagram showing a principle set-up of a power supply device 200 according to yet another typical embodiment. It is noted here that components and steps which have been described herein above with respect to FIG. 2 are not repeated in order to avoid a redundant description.

As shown in FIG. 3, electrical generators 201, 202, 203 . . . 204 are provided which are connected to a combination unit 206 via transformers 205a-205n. As mentioned above, the transformers 205a-205n may be of different vector groups or vector group configurations, e.g. dyn 5 and/or dyn 11.

The combination unit 206 combines the output currents of the transformers 205a-205n, (i.e. the first output current 301, the second output current 302, the third output current 303, . . . and the n-th output current 304) in order to yield a combination current 306. As the transformers 205a-205n transform the output energy output from the electrical generators 201-204 from the low-voltage range to the high-voltage range, an output transformer 207 is provided in order to transform the combination current 306 from the high-voltage range to a voltage range which is used in a load which receives the electrical output energy.

In the typical embodiment shown in FIG. 3, the electrical load is provided as an electrical power supply grid 208 which receives a transformed combination current 307 from the output transformer 207 in a medium-voltage range. Thus, the transformer 207 transforms the combination current 306 from a high-voltage range to a medium-voltage range. According to the typical embodiment shown in FIG. 3, the electrical generators 201-204 and/or the transformers 205a-205n are designed in different configurations such that harmonics generated in the transformers 205a-205n and/or within the electrical generators 201-204 (e.g. generated by switching processes) themselves do not add up, but partially spread over a spectral and/or temporal range. Due to the different electrical generators 201-204 and/or transformers 205a-205n, the individual phase angles, i.e. the angles between the voltage and the current for the individual outputs are different with respect to each other.

According to the specifications of a provider of the electrical power supply grid 208 it may be desirable to adjust a phase angle Φ between voltage and current to be zero degrees, i.e. a cosine Φ (cos Φ) is adjusted to be 1. According to the typical embodiment described with respect to FIG. 3, the first, second, third and n-th output currents exhibit different phase angles Φ. After combining the currents 301-304 the combination current 306, however, may exhibit a cosine Φ (cos Φ) of 1 (zero degrees phase shift between voltage and current).

By operating individual power supply branches including at least one electrical generator and one transformer, at different phase angles Φ between voltage and current, the harmonics which are generated will spread and partially cancel out such that a total level of harmonics is reduced.

Figure 4:
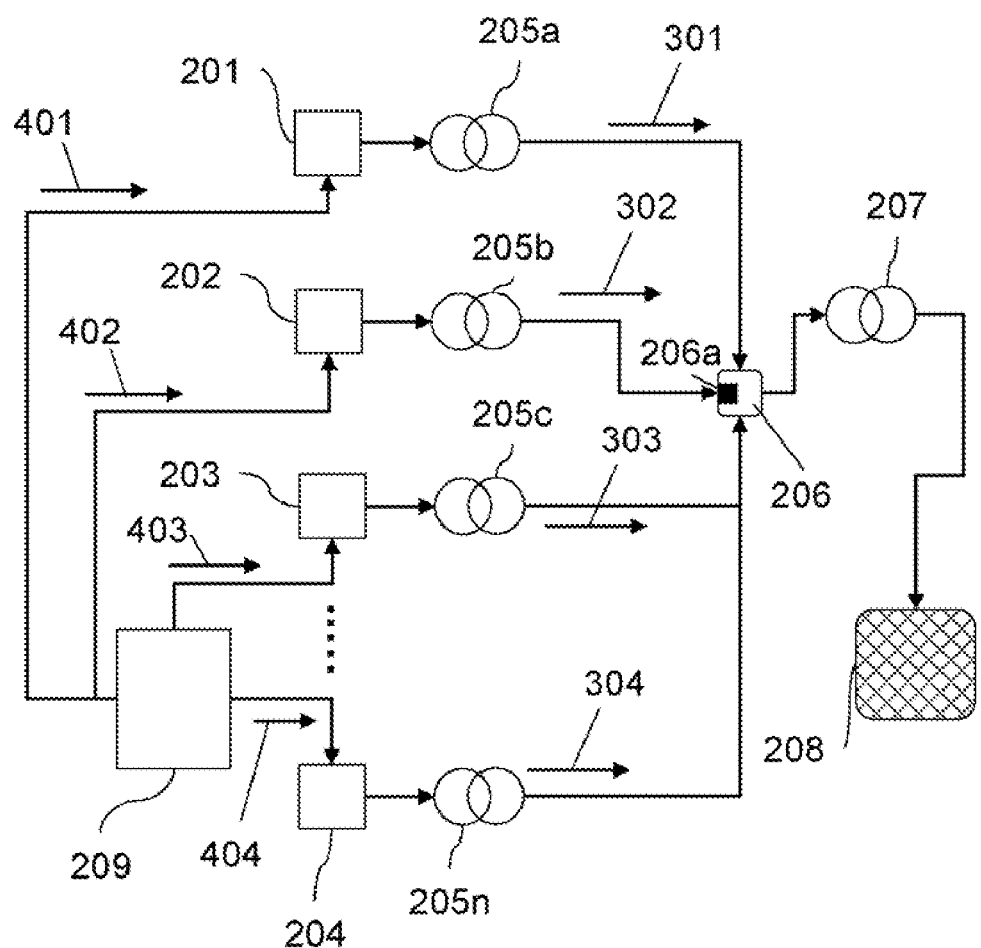
FIG. 4 is a block diagram of a power supply device including a plurality of electrical generators which are controlled by a generator control unit, for supplying electrical power to an electrical power supply grid, according to yet another typical embodiment.

FIG. 4 is a block diagram illustrating a power supply device 200 according to yet another typical embodiment. It is noted here that components and steps which have been described herein above with respect to previous figures are not repeated in order to avoid a redundant description. Compared to the power supply devices 200 shown in FIGS. 2 and 3, the power supply device 200 illustrated in FIG. 4 moreover includes a generator control unit 209.

The generator control unit 209 provides control signals for adjusting the phase angles of the individual generators, i.e. phase angle signals 401-404 (a first phase angle signal 401 for the first electrical generator 201, a second phase angle signal 402 for the second electrical generator 202, a third phase angle signal 403 for the third electrical generator 203 and an n-th phase angle signal 404 for the n-th electrical generator 204). The phase angle signals 401-404 are provided in order to adjust the phase angles, i.e. angles between voltage and current, at the individual electrical generators 201-204 to a predetermined value.

In order to be able to perform the phase angle adjustment the electrical generators 201-204 include, although not shown in FIG. 4, phase angle adjustment units which provide an adjustment of the phase angle of the respective electrical generator. This adjustment may provide different phase angles for the first, second, third, . . . n-th output currents 301-304.

It is noted here that at least one of the first and second electrical generators may include a generator control unit adapted to set the phase angle to a predetermined value. This value may be such that, upon adding up respective output currents, a total level of harmonics included in the combination current 306 is reduced.

If only two generators are provided the phase angle of their output current harmonics may differ by 180 degrees. Moreover, if a number of additional output current harmonics are provided the phase angles of the individual output current harmonics may be adjusted such that they cancel out each other, at least partially.

Thus, even if the transformers 205a-205n and the remaining components of the electrical generators 201-204 are similar, the phase angle adjustment by means of the generator control unit 209 provides a harmonic reduction. This harmonic reduction is possible by operating the individual electrical generator 201-204 at different phase angles. Furthermore, it is possible to adjust the individual phase angles of the individual electrical generators 201-204 such that a resulting phase angle of an output current output by the combination unit 206 exhibits a defined power factor.

Figure 5:
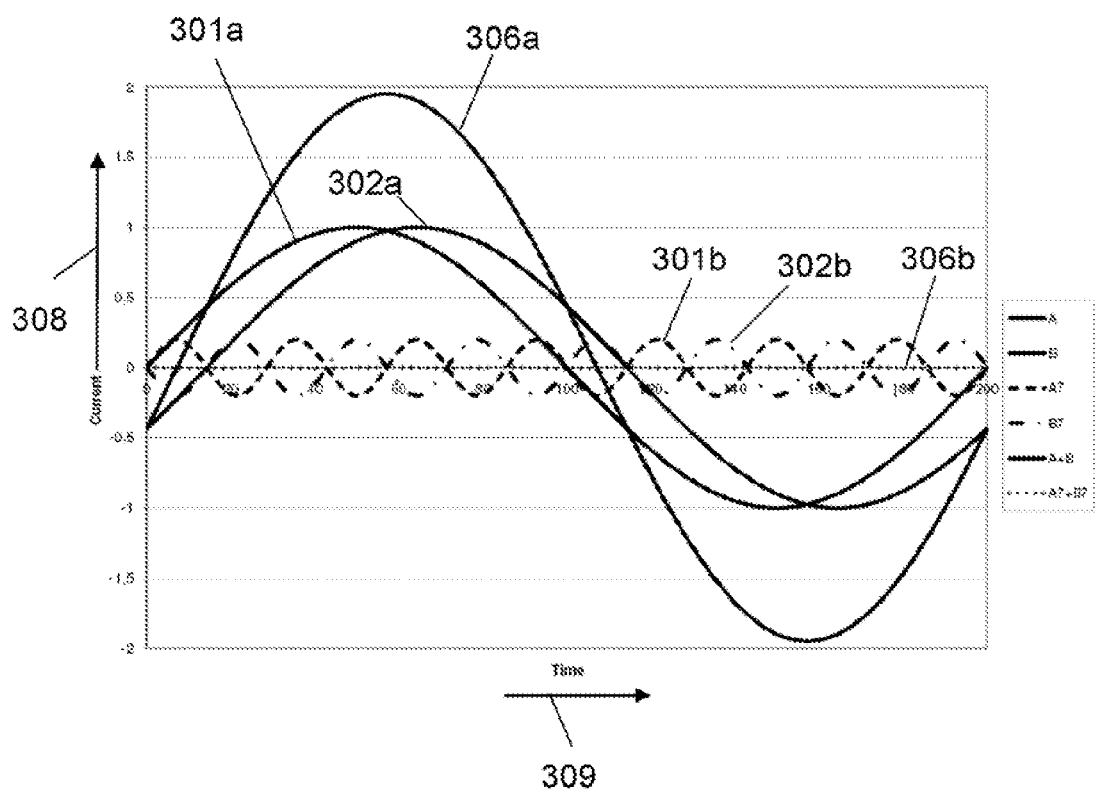
FIG. 5 is an amplitude diagram showing different output currents of individual electrical generators and respective combination currents, as a function of time.

FIG. 5 is an amplitude diagram 300 illustrating a time dependence of output currents 301a, 302a and their $7^{th}$ harmonic currents 301b, 302b output by individual electrical generators. In accordance with a design of the electrical generators 201-204 (see FIGS. 2, 3 and 4) and/or with an adjustment of the phase angles of the individual electrical generators 201-204 by means of the generator control unit 209 (see FIG. 4), the phase angles of the individual output currents 301, 302 shown in FIG. 5 may vary such that a mutual phase angle difference between the output currents 301a, 302a and their $7^{th}$ harmonic currents 301b, 302b may exist. In the diagram of FIG. 5, the $7^{th}$ harmonic currents 301b, 302b are shown as being in-phase with their fundamental output currents 301a, 302a, but this is not necessarily so and may vary. It is noted here that a current (or voltage) amplitude 308 for the output currents 301a, 302a and their $7^{th}$ harmonic currents 301b, 302b is shown as a function of time 309. With respect to the amplitude diagram 300 shown in FIG. 5, it is assumed that the electrical generators 201, 202 provide individual output currents 301, 302. As shown in FIG. 5, the phase angle of the $7^{th}$ harmonic currents 301b (A7) and 302b (B7) of the output currents 301a (A), 302a (B) is offset by approximately 180 degrees with respect to each other such that the resulting $7^{th}$ harmonic combination current 306b (A7+B7) resulting from the combination of the individual $7^{th}$ harmonic currents 301b (A7) and 302b (B7) is very small. Thus, the small phase difference of the output currents 301a (A), 301b (B) with respect to each other results in a phase shift of approximately 180 degrees between the $7^{th}$ harmonic currents 301b (A7) and 302b (B7). Therefore the $7^{th}$ harmonic currents 301b (A7) and 302b (B7) may eliminate each other to a large extent if combined to the combination current 306b (A7+B7).

It is noted here that for ease of explanation only two individual output currents are shown to sum up, however, more than two output currents having different phases may be added. Additionally the harmonic currents may have a phase shift with respect to their individual fundamental currents, respectively. A summing-up of several output currents with different phase offsets may result in even better ripple cancellation and harmonic reduction, respectively, with respect to each other. Thus it is possible that the combination unit may combine the first output current and the at least one second output current to a combination current with reduced harmonics.

It is noted here that an operation of the individual electrical generators 201-204 at different phase angles between voltage and current can be obtained by either choosing appropriate components of the electrical generators 201-203 and/or the transformers 205a-205n, as shown in FIGS. 2 and 3, and alternatively by adjusting the phase angles of the individual electrical generators 201-204 by means of specific phase angle signals 401-404.

According to yet another typical embodiment, both phase angle modification methods as described with respect to FIGS. 2 and 3 on the one hand and FIG. 4 on the other hand may be combined. Furthermore, a combination with other methods for harmonics reduction may be provided (e.g. interleaved switching and/or use of different switching frequencies of frequency converters in the power supply device 200).

Figure 6:
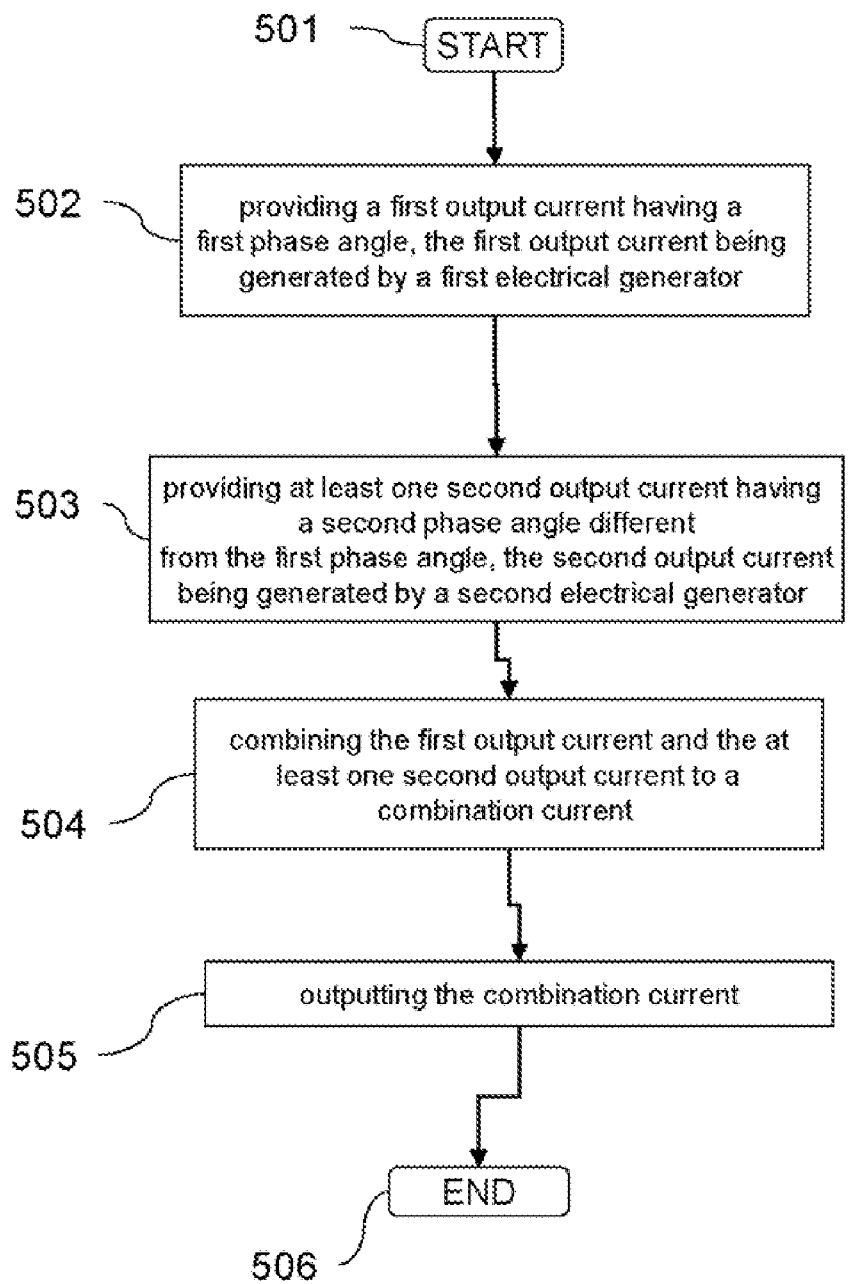
FIG. 6 is a flowchart illustrating a method for operating at least two electrical generators at individual phase angles, according to yet another typical embodiment.

FIG. 6 is a flowchart illustrating a method for operating at least two electrical generators. The method starts at a block 501 and proceeds to a block 502 where a first output current having a first phase angle between voltage and current (cos Φ) is provided. The first output current is generated by a first electrical generator.

Then, the procedure advances to a block 503 where at least one second output current is provided. The at least one second output current has a phase angle different with respect to the phase angle of the first output current, e.g. the first phase angle. The second output current is generated by a second electrical generator within the power supply device 200 described herein above with respect to FIGS. 2, 3 and 4.

After having provided the first output current and the second output current, the procedure advances to a block 504 where the first output current and the second output current are combined to a combination current by means of a combination unit. Then the procedure advances to a block 505 where the first output current and the second output current are output as a combination current. After outputting the combination current at a block 505, the procedure is ended at a block 506.

The power supply device 200 in accordance with FIGS. 2, 3 and 4 described above may be employed in large wind farms including a plurality of wind turbines 100 illustrated in FIG. 1. Each of the plurality of wind turbines 100 may include one electrical generator in order to convert the rotational energy provided by the incoming wind 105 into an electrical energy.

According to a typical embodiment, the individual electrical generators of the wind turbines are designed in a different manner such that different phase angles between voltage and current for individual generators of wind turbines 100 are provided. If the power supply device 200 shown in FIG. 4 is employed in a wind farm such that the individual electrical generators 201, 202, 203 and 204 are generators arranged within individual wind turbines 100, then the generator control unit 209 may be provided as a wind farm management system (WFMS). This wind farm management system 209 is then capable of adjusting individual phase angles of each wind turbine and of each electrical generator, respectively.

This written description uses examples to disclose the invention, including the best mode, and also to enable any person skilled in the art to practice the described subject-matter, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope is defined by the claims, and may include such modifications and other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power supply device configured to supply electrical power to a load, comprising:
   a first electrical generator configured to provide a first output current having a first phase angle;
   a second electrical generator configured to provide a second output current having a second phase angle independent of the first phase angle;
   a generator control unit electrically coupled to each of the first electrical generator and the second electrical generator and configured to provide a control signal to each of the first electrical generator and the second electrical generator to individually adjust each of the first phase angle and the second phase angle so that each of the first electrical generator and the second electrical generator operates at different phase angles; and
   a combination unit configured to combine the first output current and the second output current to a combination current having reduced harmonics compared to the first output current and the second output current.

2. The device in accordance with claim 1, wherein the first electrical generator is connected to a first transformer and the second electrical generator is connected to a second transformer wound differently with respect to the first transformer of the first electrical generator.

3. The device in accordance with claim 2, wherein the first transformer and the second transformer are of different vector group configurations.

4. The device in accordance with claim 2, wherein at least one of the first electrical generator and the second electrical generator comprises the generator control unit.

5. The device in accordance with claim 1, further comprising a filter configured to filter at least one of the combination current, the first output current and the second output current.

6. The device in accordance with claim 1, wherein the combination current is supplied to a load comprising an electrical power supply grid.

7. The device in accordance with claim 1, wherein at least one of the first electrical generator and the second electrical generator comprises the generator control unit.

8. The device in accordance with claim 1, further comprising at least one electrical transformer connected between the combination unit and the load and configured to transform an electrical output of the combination unit to a specified voltage range.

9. A wind farm configured to supply electrical power to a load, comprising;
   a first wind turbine having a first electrical generator, wherein the first electrical generator is configured to provide a first output current having a first phase angle;
   a second wind turbine having a second electrical generator, wherein the second electrical generator is configured to provide a second output current having a second phase angle independent of the first phase angle;
   a generator control unit electrically coupled to each of the first electrical generator and the second electrical generator and configured to provide a control signal to each of the first electrical generator and the second electrical generator to individually adjust each of the first phase angle and the second phase angle so that each of the first electrical generator and the second electrical generator operates at different phase angles; and
   a combination unit configured to combine the first output current and the second output current to a combination current having reduced harmonics with respect to the first output current and the second output current.

10. The wind farm in accordance with claim 9, wherein the first electrical generator comprises a first transformer and the second electrical generator comprises a second transformer wound differently with respect to the first transformer of the first electrical generator.

11. The wind farm in accordance with claim 10, wherein the first transformer and the second transformer are of different vector group configurations.

12. The wind farm in accordance with claim 9, wherein the combination unit comprises a filter configured to filter the combination current.

13. The wind farm in accordance with claim 9, wherein at least one of the first electrical generator and the second electrical generator comprises the generator control unit.

14. The wind farm in accordance with claim 9, further comprising at least one electrical transformer connected between the combination unit and the load and configured to transform an electrical output of the combination unit to low, medium or high voltage ranges.

15. A method for operating at least two electrical generators, comprising:
   providing a first output current having a first phase angle, the first output current being generated by a first electrical generator;
   providing, a second output current having a second phase angle independent of the first phase angle, the second output current being generated by a second electrical generator;
   providing a control signal to each of the first electrical generator and the second electrical generator to individually adjust each of the first phase angle and the second phase angle so that each of the first electrical generator and the second electrical generator operates at different phase angles;
   combining the first output current and the second output current to a combination current having reduced harmonics with respect to the first output current and the second output current; and
   outputting the combination current to a load.

16. The method in accordance with claim 15, wherein combining the first output current and the second output current results in an output phase angle of zero degrees.

17. The method in accordance with claim 15, further comprising a plurality of electrical generators the output currents of which differ in phase.

18. The method in accordance with claim 15, wherein the phase angles of the first output current and the second output current are adjusted such that a level of harmonics of a fundamental wave in the combination current is reduced.

19. The method in accordance with claim 15, wherein the phase angles of the first output current and the second output current are adjusted by means of a wind farm management system.

* * * * *

UNITED STATES PATENT AND TRADEMARK OFFICE
CERTIFICATE OF CORRECTION

PATENT NO. : 8,405,251 B2
APPLICATION NO. : 12/763249
DATED : March 26, 2013
INVENTOR(S) : Werner Barton et al.

It is certified that error appears in the above-identified patent and that said Letters Patent is hereby corrected as shown below:

In the Claims:

In Column 8, Line 30, in Claim 9, delete "comprising;" and insert -- comprising: --, therefor.

In Column 9, Line 6, in Claim 15, delete "providing," and insert -- providing --, therefor.

Signed and Sealed this
Ninth Day of July, 2013

Teresa Stanek Rea
*Acting Director of the United States Patent and Trademark Office*